United States Patent Office 3,222,120
Patented Dec. 7, 1965

3,222,120
METHOD FOR PREPARING HIGH PURITY CRYSTALS OF LITHIUM BOROHYDRIDE
Frank P. Del Giudice, Beverly, Mass., assignor to Metal Hydrides Incorporated, Beverly, Mass., a company of Massachusetts
No Drawing. Filed July 22, 1960, Ser. No. 44,568
8 Claims. (Cl. 23—14)

This invention relates to unsolvated crystals of lithium borohydride and to methods for preparing the same.

Lithium borohydride may be prepared by the metathetical reaction of a lithium halide and sodium borohydride as illustrated by the equation:

$$LiCl + NaBH_4 \rightarrow LiBH_4 + NaCl$$

The reaction medium may be either an amine, usually isopropylamine, or a mixture of solvents, such as a mixture of isopropylamine and diethyl ether. The sodium chloride is precipitated and removed by filtration, the lithium borohydride being in solution in the filtrate. Solid lithium borohydride may be recovered by removing the solvent from the filtrate by distillation under vacuum. However, the solvents for lithium borohydride, such as the amines and ethers, form solvates or adducts with lithium borohydride at ambient temperatures. In the removal of solvent, the lithium borohydride passes through the solvate stage and into the unsolvated form. In desolvating the lithium borohydride by distillation under vacuum, a non-crystalline, porous, powdery material is obtained.

If lithium borohydride is crystallized out of a solution, the resulting crystals are solvates or adducts of lithium borohydride with the solvent. The lithium borohydride content of these adducts is low. For example, the diethyl ether adduct contains 22.7 percent lithium borohydride while the isopropylamine adduct contains 27 percent lithium borohydride.

The present invention makes possible the preparation of unsolvated crystals of substantially pure lithium borohydride which are uniformly well formed, non-porous and smooth faced.

For certain uses, it is desirable to protect lithium borohydride with a protective coating. The high purity non-porous, smooth faced lithium borohydride crystals of the present invention are more suitable for receiving an effective coating than the non-crystalline, porous and powdery form of lithium borohydride available prior to the present invention.

The method for preparing unsolvated crystals of lithium borohydride in accordance with the present invention involves forming a three component system consisting of (1) lithium borohydride, (2) a solvent for lithium borohydride and (3) a liquid hydrocarbon in an amount by weight at least about six times greater than the amount of lithium borohydride by weight in the system. In practice it is convenient to use a substantially greater proportion of liquid hydrocarbon.

Such a three component system may be formed by mixing the liquid hydrocarbon with a solution of lithium borohydride in a solvent therefor in excess of the amount required to dissolve completely the lithium borohydride. This system then may be heated to remove solvent by distillation to render the solution substantially saturated with lithium borohydride while maintaining the ratio of the amount of liquid hydrocarbon to the amount of lithium borohydride by weight at not less than about 6 to 1. The heated material then may be cooled to cause precipitation of unsolvated crystals of lithium borohydride which may be recovered by filtration. Alternatively, heating of the previously mentioned heated material may be continued to remove additional solvent while maintaining the ratio of the amount of liquid hydrocarbon to the amount of lithium borohydride by weight in the system at not less than about 6 to 1 and thereby cause precipitation of crystals of unsolvated lithium borohydride. If necessary, additional liquid hydrocarbon may be added during distillation of the solvent to maintain the ratio of the amount of hydrocarbon to the amount of lithium borohydride by weight in the system at not less than about 6 to 1.

The above mentioned three component system also may be formed by mixing the liquid hydrocarbon with an adduct or solvate of lithium borohydride with a solvent for the latter. In such case, crystals of unsolvated lithium borohydride are precipitated. This method, however, is not the presently preferred method.

In the practice of the method of the invention any solvent for lithium borohydride may be used. Illustrative solvents are pyridine; primary lower alkyl amines, such as methylamine, ethylamine, propylamine, isopropylamine and butylamine; liquid ammonia; tetrahydrofuran; lower alkyl ethers, such as diethyl ether, isopropyl ether, butyl ether and dimethyl ether. Also, any liquid hydrocarbon is suitable for use in the practice of the method of the invention. Illustrative liquid hydrocarbons are ligroin, benzene, toluene, xylene and aliphatic hydrocarbons preferably containing from 6 to 10 carbon atoms, such as hexane, cyclohexane and octane. The presently preferred solvents are isopropylamine and diethyl ether and the presently preferred hydrocarbon is benzene.

The invention is illustrated further by the following specific examples.

Example 1

250 grams of an isopropylamine solution of lithium borohydride containing about 11 percent of lithium borohydride and 250 grams of benzene were added to a 1-liter, 3-neck flask. A distillation condenser, dropping funnel and thermometer were fitted to the flask and the contents atmospherically distilled. When the vapor temperature rose to 78° C. (boiling point of benzene is 80° C. at atmospheric pressure), more benzene was added to the system. The benzene addition was concomitant to and at a rate equal to the distillation until the vapor temperature rose to 80° C. The system was cooled to room temperature and the slurry filtered. The crystals were washed with two 100 ml. portions of benzene. The wet crystals assayed 80.0 percent lithium borohydride. This product was dried in vacuo at 150° C. and reassayed 91.0 percent lithium borohydride. The crystals were well formed and smooth surfaced before and after vacuum drying.

Example 2

250 grams of a diethyl ether solution of lithium borohydride containing 3.3 percent lithium borohydride and 250 grams of benzene were added to a 1-liter, 3-neck flask equipped as described in Example 1. The contents of the flask was atmospherically distilled until the vapor temperature increased to 70° C. The system was cooled to room temperature and the slurry filtered. The filter residue of the wet crystals assayed 70 percent lithium borohydride. Vacuum drying at 150° C. increased the assay to 93 percent. A microscopic examination of the crystals revealed that the crystallinity remained unchanged from the drying process.

I claim:

1. The method for preparing crystals of unsolvated lithium borohydride which comprises forming a three component system consisting of (1) lithium borohydride, (2) a solvent for lithium borohydride, and (3) a liquid hydrocarbon, said solvent being saturated with lithium borohydride, and causing lithium borohydride to be precipitated from said system while maintaining the ratio of the amount of said hydrocarbon by weight to the amount of lithium borohydride by weight in said system at not less than about 6 to 1, said solvent being selected from the group consisting of lower dialkyl ethers, primary alkylamines, pyridine, tetrahydrofuran, liquid ammonia and mixtures thereof, said liquid hydrocarbon being selected from the group consisting of benzene, toluene, xylene, ligroin, aliphatic hydrocarbons containing from about 6 to 10 carbon atoms, and mixtures thereof.

2. The method as described by claim 1 wherein lithium borohydride is caused to be precipitated by cooling the system.

3. The method as described by claim 1 wherein lithium borohydride is caused to be precipitated by heating the system to remove solvent therefrom.

4. The method as described by claim 1 wherein the solvent is isopropylamine.

5. The method as described by claim 1 wherein the solvent is diethyl ether.

6. The method as described by claim 1 wherein the liquid hydrocarbon is benzene.

7. The method as described by claim 4 wherein the liquid hydrocarbon is benzene.

8. The method as described by claim 5 wherein the liquid hydrocarbon is benzene.

References Cited by the Examiner

Chizinsky et al.: "Journal of the American Chemical Society," Volume 77, pages 3164–3165 (1955).

Gaylord: "Reduction With Complex Metal Hydrides," 1956, page 20.

Hurd: "Chemistry of the Hydrides," 1952, pages 162–163.

Hurd: "Chemistry of the Hydrides," 1952, page 170.

Progress Report, Contract NOa(s) 9901, prepared by Metal Hydrides Inc. for Bureau of Aeronautics, printed Oct. 23, 1949, declassified Mar. 15, 1957, 7 pages total.

Schlesinger et al. (I): "Journal of the American Chemical Society," Vol. 75, pages 209–213 (1953).

Schlesinger et al. (II): "Journal of the American Chemical Society," Vol. 62, pages 3429–3435 (1940).

Schlesinger et al.: "Journal of the American Chemical Society," Vol. 75, pages 199–204 (Jan. 5, 1953).

Weissberger: "Technique of Organic Chemistry," Volume III, Part I, Separation and Purification, 2nd Edition, 1956, pages 470–479.

MAURICE A. BRINDISI, *Primary Examiner.*